United States Patent

Cornea et al.

[11] Patent Number: 5,871,201
[45] Date of Patent: Feb. 16, 1999

[54] ELECTROMAGNET WITH SLEEVE-SHAPED HOUSING

[75] Inventors: Marius Cornea, Lohr/Main; Helmut Patze, Frammersbach; Franz-Josef Schleifstein, Schmallenberg-Dorlar, all of Germany

[73] Assignee: Mannesmann Rexroth AG, Lohr/Main, Germany

[21] Appl. No.: 587,970

[22] Filed: Jan. 17, 1996

[30] Foreign Application Priority Data

Feb. 9, 1995 [DE] Germany .................. 195 04 185.2

[51] Int. Cl.⁶ ........................................... F16K 31/02
[52] U.S. Cl. .................. 251/129.15; 335/278; 335/281; 29/602.1
[58] Field of Search ................. 251/129.15, 129.01; 335/255, 281, 282, 278, 297; 29/602.1, 605, 606, 607

[56] References Cited

U.S. PATENT DOCUMENTS

| 3,303,445 | 2/1967 | Flentge | 335/255 |
|---|---|---|---|
| 4,393,994 | 7/1983 | Rieck | 251/129.15 X |
| 5,170,987 | 12/1992 | Krauss et al. | 251/129.15 X |
| 5,460,146 | 10/1995 | Frankenberg | 251/129.15 X |

FOREIGN PATENT DOCUMENTS

| 0243054 | 10/1987 | European Pat. Off. . |
|---|---|---|
| 1793186 | 4/1958 | Germany . |
| 3518978 | 11/1986 | Germany . |
| 8914152 | 2/1990 | Germany . |
| 3902218 | 8/1990 | Germany . |

OTHER PUBLICATIONS

Bauelemente der Feinmechanik by O.Richter R.v. Ross, p. 120, Verlag Technik Berlin 1952.

*Primary Examiner*—Kevin Lee
*Attorney, Agent, or Firm*—Martin A. Farber

[57] ABSTRACT

In an electromagnet with sleeve-shaped magnet housing with integrated valve body, in particular for the actuating of valves, the pole core is developed as a separate part and is surrounded by the sleeve-shaped magnet housing. The magnet housing has inward-directed corrugations distributed uniformly over its circumference which serve as axial support for the pole core in the direction of the electric windings.

10 Claims, 2 Drawing Sheets ically connected with the tank connection T, a pump connection P as well as two working connections A

ELECTROMAGNET WITH SLEEVE-SHAPED HOUSING

FIELD AND BACKGROUND OF THE INVENTION

The present invention relates to an electromagnet having a sleeve-shaped housing and an integrated pole core, in particular for the actuating of valves such as fuel injection valves.

In known electromagnets, the sleeve-shaped housing is produced as a lathe-turned part from a solid block and the pole core is developed as part of the housing. The housing extends in sleeve shape beyond the bottom of the pole core, an extension of the housing being fastened to a valve housing by flanging around the end thereof. This known construction of a magnet housing is very expensive to manufacture.

SUMMARY OF THE INVENTION

The object of the present invention is therefore so to develop an electromagnet having a sleeve-shaped housing and integrated pole core that, without having to tolerate magnetic losses, substantially simpler manufacture thereof is assured.

In accordance with the invention, this is achieved by the pole core (8) being formed as an independent lathe-turned part and being surrounded by the sleeve-shaped magnet housing (4), and wherein the magnet housing has inward-directed corrugations (10) distributed uniformly over its circumference as axial support for the pole core in a direction of the electric winding (3). By separating the pole core from the magnet housing, the latter can be manufactured in simple manner from a length of pipe or, as a further development of the invention, as a deep-drawn part, the pole core being produced as a simple lathe-turned part. A simple axial support for the pole core in the magnet housing is provided by corrugations produced on the circumference of the sleeve-shaped magnet housing.

Another feature of the invention is that an end (4c) of the side of the magnet housing (4) receiving the pole core (8) extends over the pole core and over a collar (36), an end side (36a) of the collar (36) rests against the pole core, there being a structural part which is to be connected with the magnet housing, in particular of a valve body (28) which is flanged on its collar.

Still a further feature of the invention is that the magnet housing (4) is developed as a deep-drawn part having a bottom part (3) which has an opening (38) for a leading in and out of an electric connection for the magnet, and the coil former (5) bears the electric winding (3) and is held fast axially between bottom part (4a) and the flange (8a) of the pole core.

BRIEF DESCRIPTION OF THE DRAWINGS

With the above and other objects and other advantages in view, the present invention will become more clearly understood in connection with the detailed description of a preferred embodiment, when considered with the accompanying drawing of which.

DETAILED DESCRIPTION OF THE PREFERRED EMBODIMENT

Figure 1:
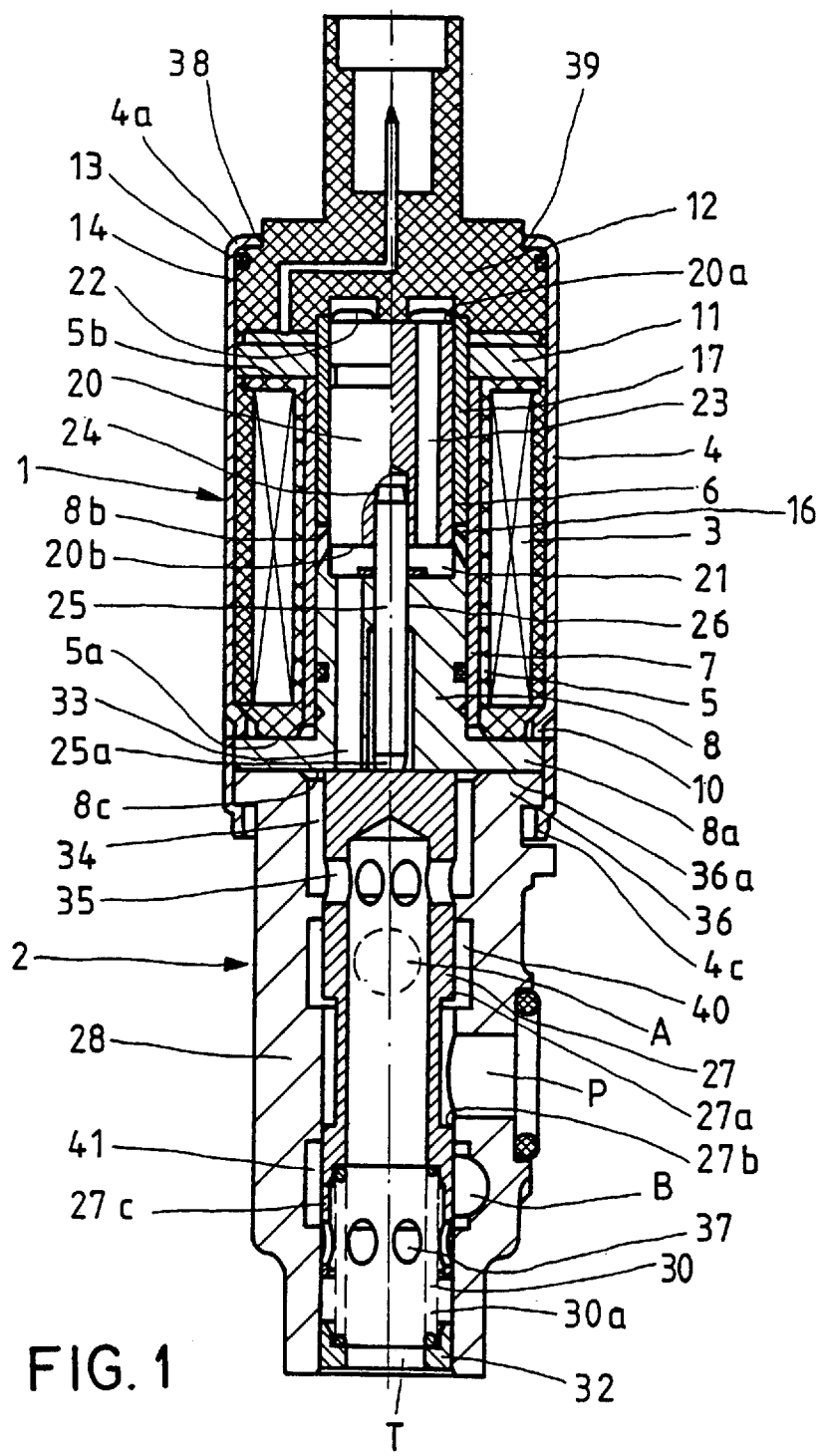
FIG. 1 of the drawing is an axial section through an electromagnet which is connected to a distributing valve.
Figure 2:
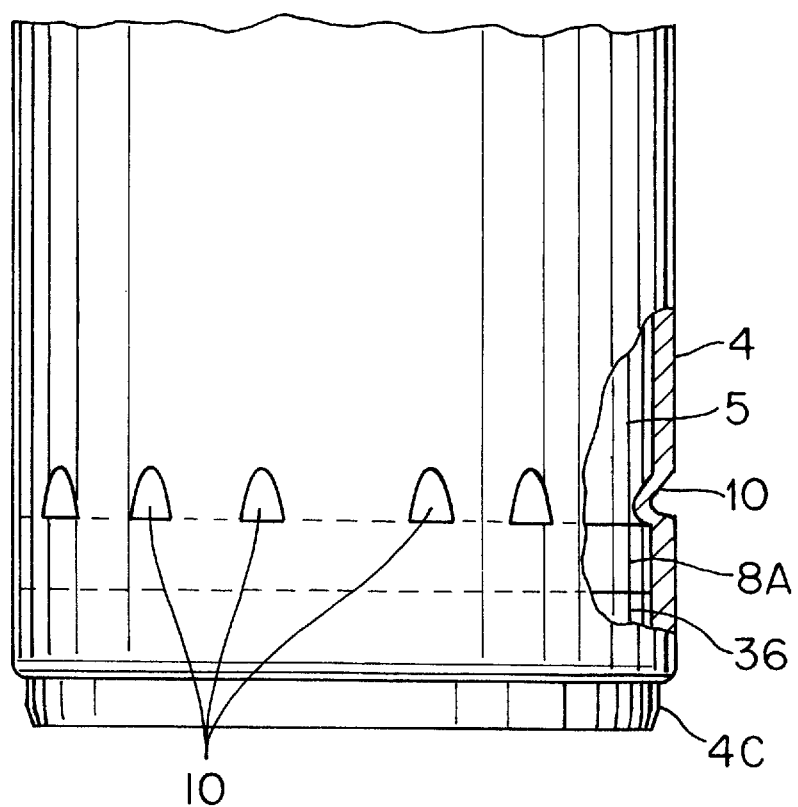
FIG. 2 is an enlarged fragmentary elevation view of the electromagnet of FIG. 1 with a portion of a housing being cut away to show interior components, and corrugation.

In FIG. 1, an electromagnet 1 and a distributing valve 2 are shown. An electric winding 3 of the electromagnet is surrounded by the sleeve-shaped magnet housing 4. Between a coil former 5 which receives the electric winding 3 and the armature space 6, a non-magnetizable metal tube 7 is arranged. On the valve-side, a pole core 8 which is provided with a flange 8a extends into the metal tube 7. The outside diameter of the flange 8a corresponds to the inside diameter of the sleeve-shaped magnet housing 4. In the direction of the coil-former 5, the flange rests on inward-directed corrugations 10 which are distributed uniformly over the circumference of the magnet housing 4 as shown in FIG. 2. The end 5a of the coil former 5 rests on the flange 8a of the pole core. The opposite end 5b of the coil former rests, via the pole disk 11, on an electric connecting body 12 which consists of plastic. The body 12 rests resiliently in axial direction on an inward-directed collar 4a of the magnet housing 4 by means of an elastic ring 13 which lies in a circumferencial recess 14 in the connecting body 12. In this way, the coil former with winding is fixed in play-free manner in the magnet housing.

The pole core 8 has a sleeve-shaped extension 8b which faces, via an air gap 16, a pole tube 17 which forms a magnetic unit with the pole disk 11. There are spaces 21, 22 defined by the end sides 20a and 20b of the armature which are connected to each other by axial holes 23 in the armature 20. An actuating pin 25 is pressed into an axial blind hole 24 in the armature, and is guided outward through a central axial hole 26 in the pole core 8. The outwardly guided end 25a of the actuating pin 25 lies on the control piston 27 which is guided in a valve housing 28. An end 27c of the piston 27 faces away from the actuating pin 25 and is urged by a compression spring 30 in the direction of the actuating pin 25. At its one end 30a, the compression spring 30 rests against a sleeve-shaped body 32 which is fastened in a tank connection T of the valve body.

Parallel to an axial hole 26 for the actuating pin 25, there is another axial hole 23 in the pole core 8 which connects an armature space 21 with a valve space 34. The valve space 34 is connected, via radial holes 35 in the hollow control piston 27, to the tank connection T of the valve body, so that the armature spaces 21, 22 are also in communication with the tank connection T. The valve body has, on the magnet side, a surrounding collar 36 the end surface 36a of which rests against the outer end surface 8c of the flange 8a of the pole core 8.

The sleeve-shaped magnet housing 4 extends beyond the collar 36 of the valve body and is flanged at the end 4c on the collar 36 of the valve body so that magnet housing, pole core, and valve body form a rigid, self-contained structural unit. Since the coil former rests on the valve side against the flange of the pole core, and on the opposite side against the connection body, and the latter rests via an elastic ring 13 on the inward-directed collar 4a of the magnet housing, a reliable functional unit formed of actuating magnet and valve is formed.

The magnet housing is produced as deep-drawn part, a central hole being stamped out from the bottom 39 of the deep-drawn part for the leading-out of the connecting body 12 for the electric feed. The remaining part of the bottom serves as inward-directed collar 4a for the application of the elastic ring 13.

The valve body has, in addition to the tank connection T, a pump connection P as well as two working connections A and B with corresponding control spaces 40, 41. Depending on the control position of the control piston 27, by corresponding displacement by the actuating pin 25 of the armature 20 against the force of the compression spring 30, the connection A is connected via the control edge 27a of the control piston with the pump and the connection B is connected via the radial holes 37 with the pump. Alternatively, the connection B is connected via the control edge 27b of the control piston with the pump and the connection A is connected via the radial holes 35 in the control piston with the tank. In a neutral position of the control piston 27, the connections A and B are separated from both the tank and the pump P.

We claim:

1. An electromagnet comprising:
    an electric winding, a pole core having a first portion extending along an axis of the electric winding and a second portion extending perpendicularly of the axis to form a flange of the pole core, and a sleeve-shaped magnet housing enclosing the pole core;
    wherein said electric winding is disposed between the first portion of said core and said housing;
    said magnet housing has corrugations distributed uniformly over a circumference of said magnet housing to support said pole core in a direction towards said electric winding; and
    said first and said second portions of said pole core constitute a unitary integrated pole core, the configuration of said pole core permitting formation of the pole core as a lathe-turned part.

2. An electromagnet comprising:
    an electric winding, a pole core having a first portion extending along an axis of the electric winding and a second portion extending perpendicularly of the axis to form a flange of the pole core, and a sleeve-shaped magnet housing enclosing the pole core, wherein said electric winding is disposed between the first portion of said core and said housing;
    a valve body having a flanged collar with an end side abutting said pole core; and
    wherein the magnet housing has corrugations distributed uniformly over a circumference of said magnet housing to support said pole core in a direction towards said electric winding; and
    wherein an end of a side of the magnet housing receiving the pole core extends over the pole core and over the collar of the valve body and is crimped inwardly over said collar.

3. An electromagnet comprising:
    an electric winding, a pole core having a first portion extending along an axis of the electric winding and a second portion extending perpendicularly of the axis to form a flange of the pole core, and a sleeve-shaped magnet housing enclosing the pole core;
    wherein said electric winding is disposed between the first portion of said core and said housing;
    said magnet housing has corrugations distributed uniformly over a circumference of said magnet housing to support said pole core in a direction towards said electric winding;
    a valve body having a flanged collar with an end side abutting said pole core;
    wherein an end of a side of the magnet housing receiving the pole core extends over the pole core and over said collar;
    wherein said magnet housing has a bottom part opposite said pole core with an opening providing access to electric connection for said winding;
    said pole core terminates in a flange which abuts the collar of said valve body; and
    said electromagnet further comprises a coil former bearing said electric winding, said coil former being held fast axially between the bottom part of said housing and the flange of the pole core.

4. A method of manufacturing an electromagnet, comprising the steps of:
    constructing a sleeve-shaped magnet housing;
    providing inwardly directed corrugations distributed uniformly over a circumference of the housing;
    constructing a pole core independently of said step of constructing the housing, said constructing of the pole core being accomplished by constructing the pole core as a lathe-turned part;
    placing an electric winding within the housing;
    inserting the pole core within the winding and within the housing; and
    supporting the pole core upon the corrugations, the corrugations serving as axial support for the pole core in a direction towards the electric winding.

5. A method according to claim 4, wherein said step of constructing the pole core comprises steps of:
    forming a first portion of the pole core from said lathe-turned part, said first portion extending along an axis of the electric winding; and
    forming a second portion of the pole core from said lathe-turned part, said second portion extending perpendicularly of the axis to form a flange of the pole core; and
    wherein said step of placing the electric winding includes a placing of the electric winding in a space defined by said first portion of said pole core, said second portion of said pole core, and said housing.

6. A method of manufacturing an electromagnetically operated valve, comprising steps of:
    constructing a sleeve-shaped magnet housing;
    providing inwardly directed corrugations distributed uniformly over a circumference of the housing;
    constructing a pole core independently of said step of constructing the housing, said constructing of the pole core being accomplished by constructing the pole core as a lathe-turned part;
    placing an electric winding within the housing;
    inserting the pole core within the winding and within the housing;
    supporting the pole core upon the corrugations, the corrugations serving as axial support for the pole core in direction towards the electric winding;
    constructing a valve body with a flanged collar;
    placing the collar of the valve body in abutment with the pole core; and
    extending the magnet housing over the pole core and crimping the housing inwards over the collar of the valve body to hold the valve body against the pole core.

7. A method according to claim 6, wherein said step of constructing the pole core comprises steps of:
    forming a first portion of the pole core from said lathe-turned part, said first portion extending along an axis of the electric winding; and forming a second portion of the pole core from said lathe-turned part, said second portion extending perpendicularly of the axis to form a flange of the pole core; and wherein said step of placing the electric winding includes a placing of the electric winding in a space defined by said first portion of said pole core, said second portion of said pole core, and said housing.

8. An electromagnet comprising:

an electric winding, a pole core having a first portion extending along an axis of the electric winding and a second portion extending perpendicularly of the axis to form a flange of the pole core, and a sleeve-shaped magnet housing enclosing the pole core;

wherein said electric winding is disposed between the first portion of said core and said housing;

said magnet housing has a corrugation received by said pole core to support said pole core in a direction of the axis of said electric winding; and said first and said second portions of said pole core constitute a unitary integrated pole core, the configuration of said pole core permitting formation of the pole core as a lathe-turned part.

9. An electromagnet comprising:

an electric winding, a pole core having a first portion extending along an axis of the electric winding and a second portion extending perpendicularly of the axis to form a flange of the pole core, and a sleeve-shaped magnet housing enclosing the pole core;

wherein said electric winding is disposed between the first portion of said core and said housing;

said magnet housing has a corrugation which supports said pole core in a direction of the axis of said electric winding; and said first and said second portions of said pole core constitute a unitary integrated pole core, the configuration of said pole core permitting formation of the pole core as a lathe-turned part.

10. An electromagnet comprising:

an electric winding, a pole core having a first portion extending along an axis of the electric winding and a second portion extending perpendicularly of the axis to form a flange of the pole core, and a sleeve-shaped magnet housing enclosing the pole core, wherein said electric winding is disposed between the first portion of said core and said housing;

a valve body having a flanged collar with an end side abutting said pole core; and wherein the magnet housing has corrugations distributed uniformly over a circumference of said magnet housing to support said pole core in a direction towards said electric winding; and wherein an end of a side of the magnet housing receiving the pole core extends over the pole core and over the collar of the valve body and is crimped inwardly over said collar;

wherein said magnet housing has a bottom part opposite said pole core with an opening providing access to electric connection for said winding;

said pole core terminates in a flange which abuts the collar of said valve body; and said electromagnet further comprises a coil former bearing said electric winding, said coil former being held fast axially between the bottom part of said housing and the flange of the pole core.

* * * * *